(12) United States Patent
Gardner

(10) Patent No.: US 8,669,853 B1
(45) Date of Patent: Mar. 11, 2014

(54) SCHOOL BUS SAFETY LIGHTING SYSTEM

(76) Inventor: Stephen M. Gardner, Toledo, OH (US)

(*) Notice: Subject to any disclaimer, the term of this patent is extended or adjusted under 35 U.S.C. 154(b) by 68 days.

(21) Appl. No.: 13/328,178

(22) Filed: Dec. 16, 2011

Related U.S. Application Data

(60) Provisional application No. 61/425,326, filed on Dec. 21, 2010.

(51) Int. Cl.
*B60Q 1/26* (2006.01)
*B08B 5/00* (2006.01)

(52) U.S. Cl.
USPC ....... 340/433; 340/471; 340/332; 340/815.45

(58) Field of Classification Search
USPC ......... 340/431, 433, 460, 692, 468, 471–473, 340/475, 332, 815.45; 362/227, 327, 360, 362/481, 478, 479, 506
See application file for complete search history.

(56) References Cited

U.S. PATENT DOCUMENTS

| | | | | |
|---|---|---|---|---|
| 4,825,192 A | * | 4/1989 | Wells | 340/433 |
| 4,964,022 A | | 10/1990 | Lane | |
| 5,281,948 A | * | 1/1994 | Estrada | 340/433 |
| 5,467,071 A | | 11/1995 | Koenig | |
| 5,604,480 A | | 2/1997 | Lamparter | |
| 5,635,902 A | * | 6/1997 | Hochstein | 340/433 |
| 6,396,395 B1 | * | 5/2002 | Zielinski et al. | 340/425.5 |
| 6,416,209 B1 | * | 7/2002 | Abbott | 362/506 |
| 2008/0169918 A1 | * | 7/2008 | Vidri et al. | 340/487 |
| 2009/0273941 A1 | | 11/2009 | Englander et al. | |

OTHER PUBLICATIONS

School Bus Crossing Arm, Widipedia Article, downloaded Nov. 8, 2010.

* cited by examiner

*Primary Examiner* — Anh V La
(74) *Attorney, Agent, or Firm* — MacMillan, Sobanski & Todd, LLC

(57) ABSTRACT

A light affixed to the front of a school bus directs a beam of light across a road to enhance a safe crossing of the road by children boarding the bus. At least two red warning lights are mounted upon a front surface of the bus. A controller is operatively connected to the crossing light and warning lights.

11 Claims, 4 Drawing Sheets

SCHOOL BUS SAFETY LIGHTING SYSTEM

CROSS-REFERENCE TO RELATED APPLICATIONS

This application claims the benefit of U.S. Provisional Application No. 61/425,326, filed Dec. 21, 2010, the disclosure of which is incorporated herein by reference.

BACKGROUND OF THE INVENTION

This invention relates in general to school buses and in particular to a system to enhance safe loading and unloading of school buses in poor lighting conditions.

Many school districts maintain and operate a fleet of school buses for transporting students between their homes and assigned schools. The routing of the buses often requires that students must cross a street in order to board the bus. The street crossings may become dangerous during the winter months when the days are shorter and the buses must operate under poor lighting conditions or even in the dark. Although school buses are equipped with flashing lights and extendable signs, motorists still accidentally strike students when they cross the street under such reduced light conditions. Accordingly, it would be desirable to improve the safety of students when it is necessary to cross a street to board a school bus.

SUMMARY OF THE INVENTION

This invention relates to a school bus safety lighting system that includes at least one light mounted upon the front of the school bus that is directed across the road and a controller connected to the light that is operative to illuminate the light when red warning lights are activated by the bus doors being opened.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
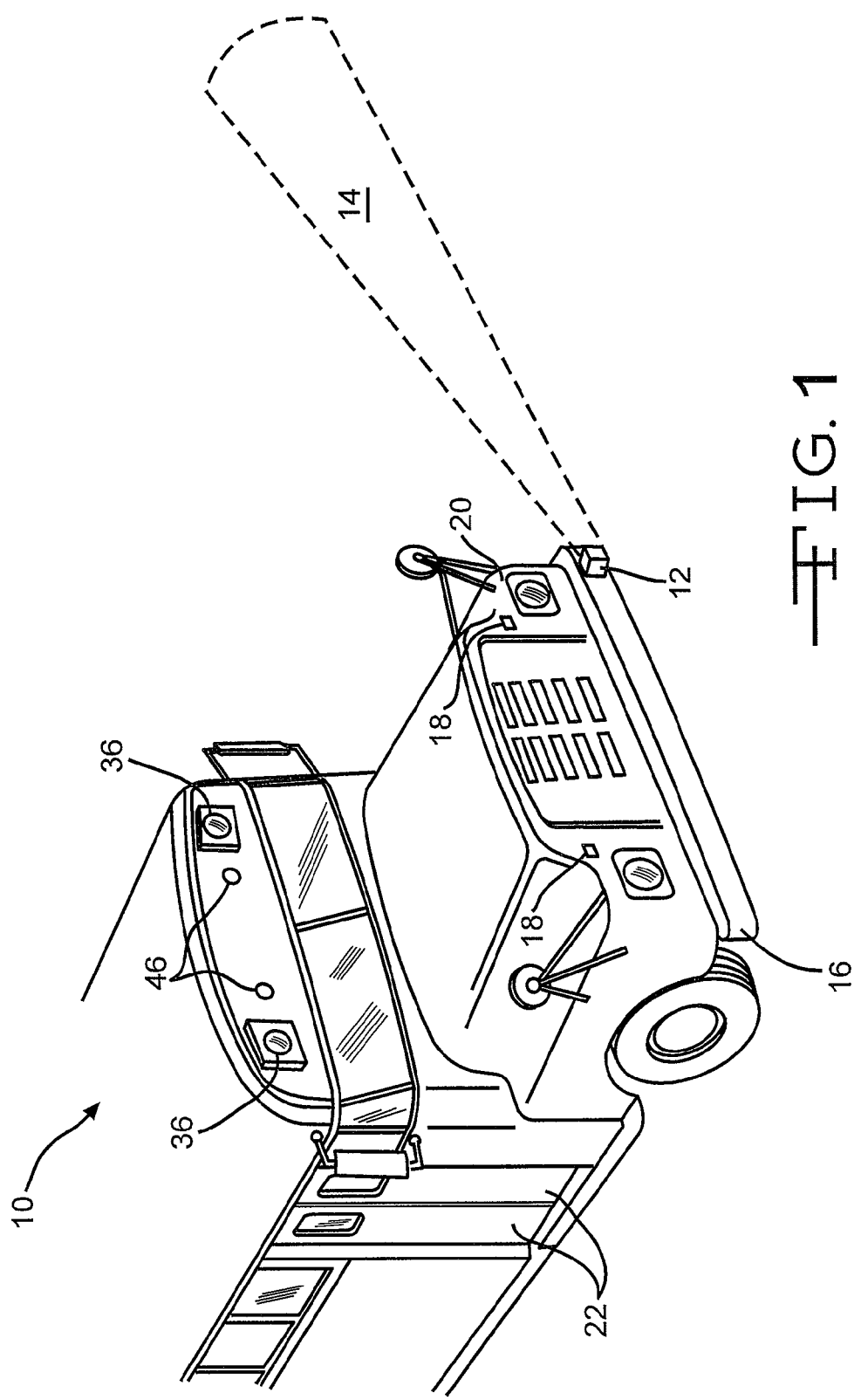
FIG. 1 illustrates a school bus safety lighting system that in accordance with the present invention.

Referring now to the drawings, there is illustrated in FIG. 1 a front portion of a school bus 10 that is equipped with the present invention. The present invention contemplates mounting a crossing light 12 on the front of the school bus 10 that is oriented to direct a beam of light 14, which is shown with dashed lines in FIG. 1, to the left of the bus and across the road. While the crossing light 12 is shown as being mounted upon a bus front bumper 16 in FIG. 1, the mounting locations may vary. It is only necessary that the light be mounted such that the light beam extends to the left of the bus 10 and completely across the road in order to fully illuminate the path of students crossing the road to board the bus during poor lighting conditions, such as exist when buses are utilized before daybreak or after sunset. Accordingly, the crossing light 12 is selected to have sufficient lumens and be sufficiently focused to illuminate the crossing path. Such lights are commercially available, such as, for example, a five-inch rectangular 1400 lumen Light Emitting Diode (LED) work light that is available from Sound Off Signal. Sound Off Signal is a manufacturer of Emergency, Truck, Bus and Commercial Vehicle LED, Halogen, Strobe Lighting, Sirens and Safety Products located in Hudsonville, Mich. However, other similar lights having other shapes and/or light output levels also may be utilized. For example, if a 1400 lumen light is judged too bright a 500 lumen or other light output light may be used with the invention. Additionally, the light does not have to be a LED, other types of lights, such as incandescent lamps also may be used. The present invention also contemplates that the crossing light 12 may be supplemented by a pair of red Light Emitting Diodes (LEDs) 18 that are mounted upon a front surface of the school bus 10 and illuminated when the crossing light 12 is illuminated.

Figure 2:
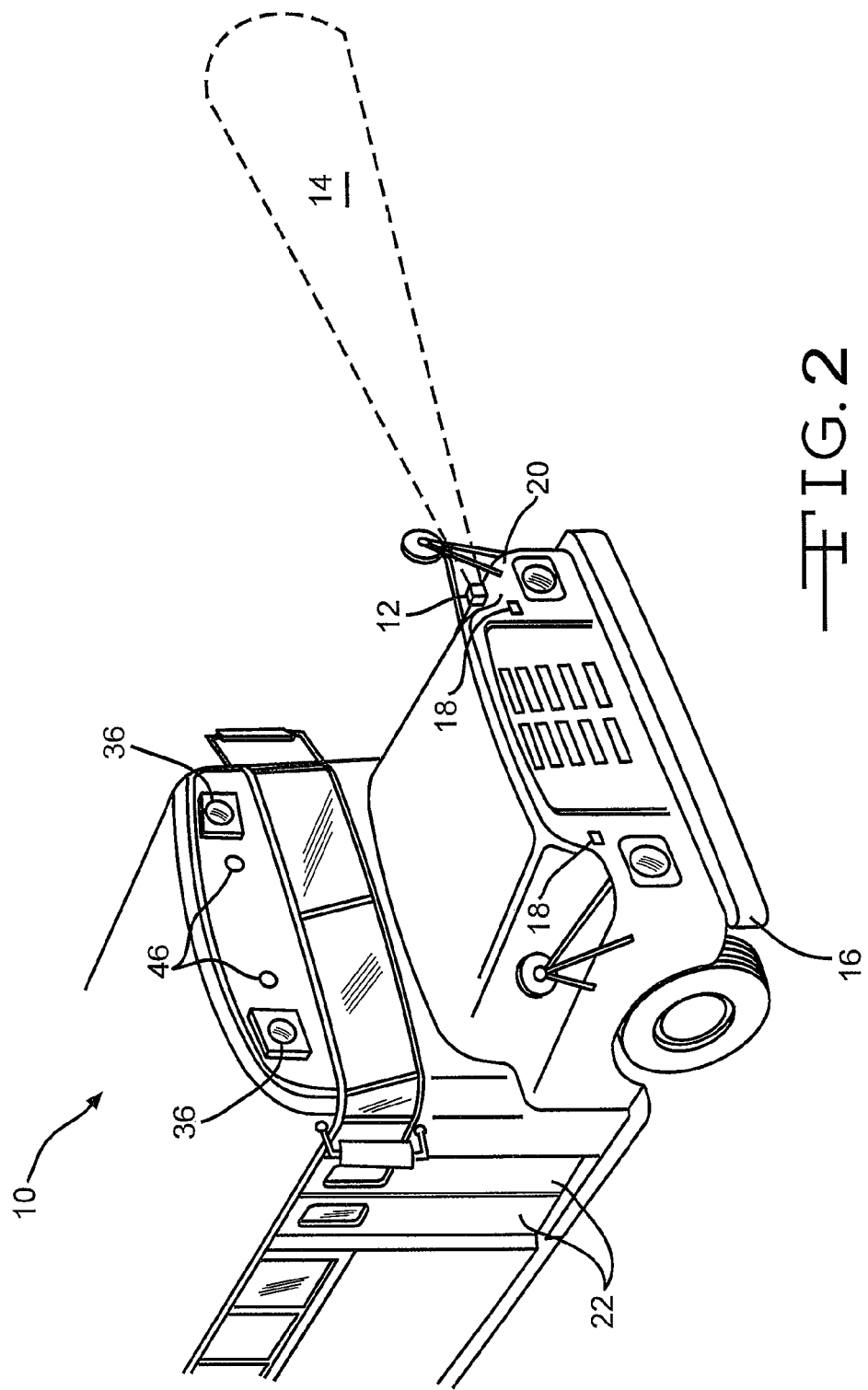
FIG. 2 illustrates an alternate embodiment the system shown in FIG. 1.

An alternate embodiment of the invention is illustrated in FIG. 2, where components that are similar to components shown in FIG. 1 have the same numerical designators. In FIG. 2, the crossing light 12 is mounted upon the left front fender 20 of the bus 10. Because the crossing light 12 is mounted at a higher position than shown in FIG. 1, the light is directed in a downward direction to assure that the road surface is illuminated.

Figure 4:
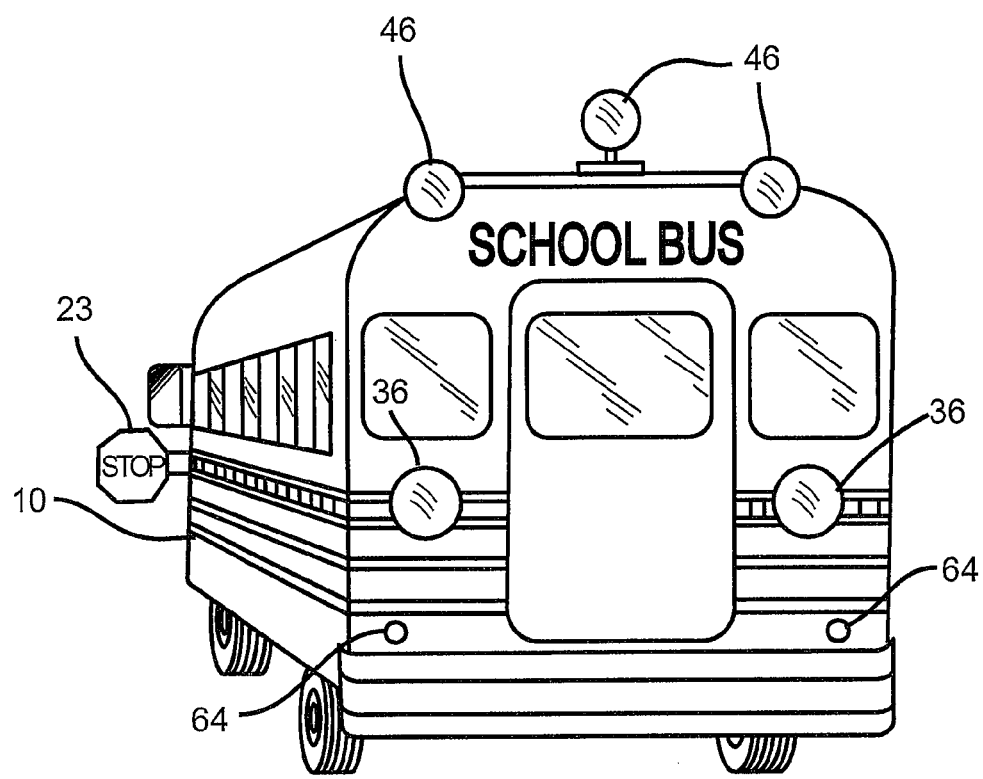
FIG. 4 is another alternate embodiment the system shown in FIG. 1.

The invention also contemplates that the operation of the crossing light 12 is integrated with the school bus controls so that the light is illuminated when the bus doors 22 are opened to load or discharge students. School buses are typically equipped with an eight light warning circuit that includes a flasher circuit (not shown) for operating amber warning lights 36 and red warning lights 46. A first switch connected to the flasher circuit is used by the bus driver to activate flashing amber warning lights 36 that are mounted on the front and rear of the bus when the bus slows and stops to warn motorists that passengers will soon be boarding or departing the bus. A second switch connected to the flasher circuit activates flashing red warning lights 46 also mounted on the front and the rear of the bus while also activating a door opening mechanism for the bus doors 22 and causing the extension of a small stop sign 23, as shown in FIG. 4, from the left side of the bus 10. Upon closing the doors 22, the extended stop sign is retracted and the red warning lights are extinguished. However, all buses do not share universal wiring codes and the exact wiring utilized may well vary by manufacturer. Nevertheless, the present invention may be easily adapted to be integrated into any bus lighting wiring system. While automatic activation of the crossing light is preferred, the crossing light also may be manually activated with a dedicated switch (not shown).

The present invention contemplates that the crossing light may be easily added to the above described existing school bus lighting system. The inventor found that the crossing light may be easily electrically connected to the bus lighting system by simply connecting the crossing light lead to the terminal on the eight light warning system that activates the small stop sign that is deployed when the bus door is opened (not shown). Because the stop sign is deployed while the red warning lights are flashing, the connection results in the crossing light also being illuminated while the doors are opened. Likewise, the crossing light is then extinguished when the doors are closed. In a similar manner, the red LEDs 18 would also be connected to the flasher terminal for deployment of the small stop sign. It will be appreciated that the invention also may be practiced with other connections of the crossing light lead than described above. Indeed, it may be possible to add a connection point to the flasher circuit that would be dedicated to illumination of the crossing light 12 and red LEDs 18.

Figure 3:
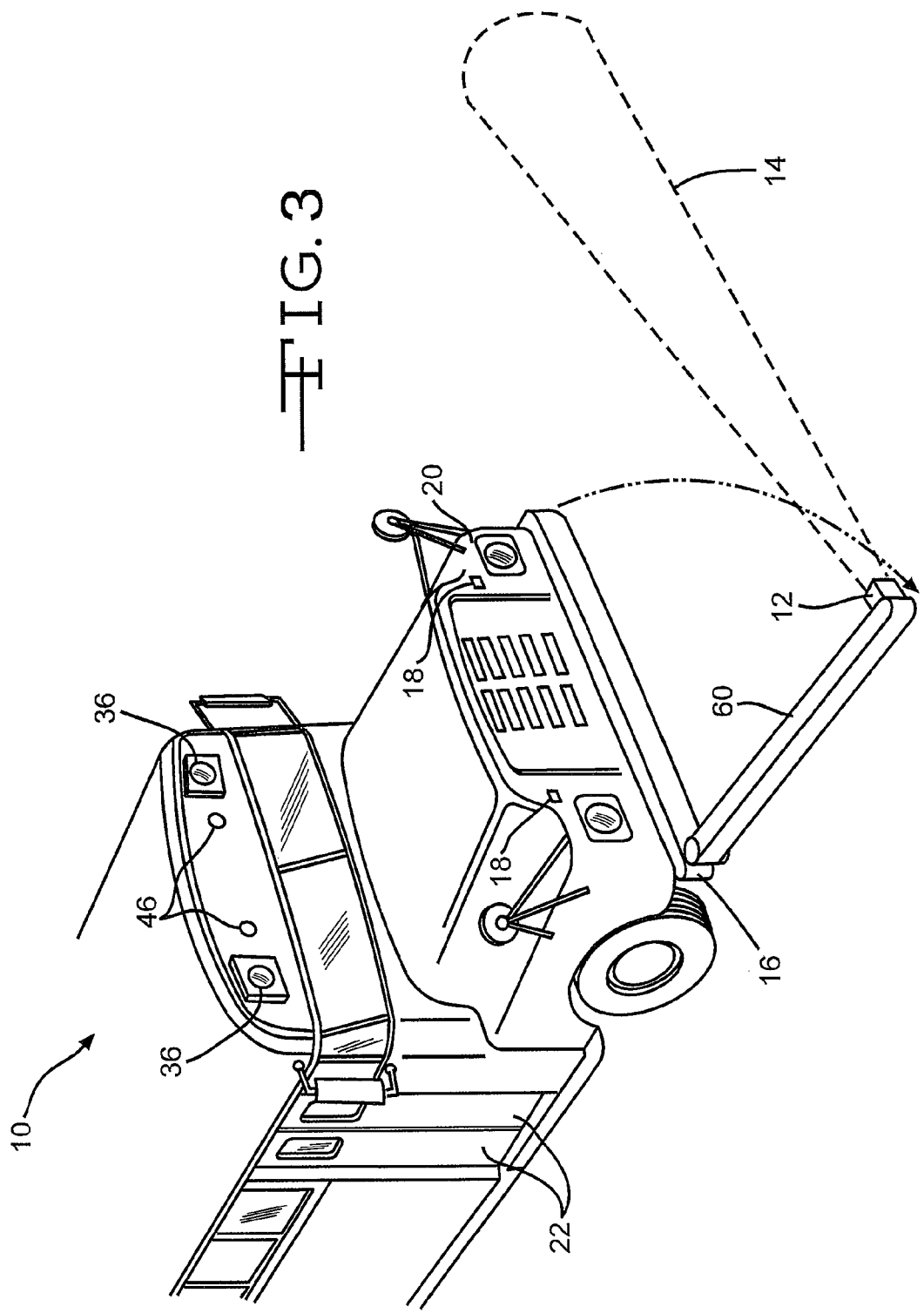
FIG. 3 is another alternate embodiment the system shown in FIG. 1.

Another embodiment of the invention is shown in FIG. 3, where components that are similar to components shown in FIGS. 1 and 2 have the same numerical designators. In FIG. 2, the crossing light 12 is mounted upon the outer end of an extended school bus crossing arm 60. A school bus crossing arm 60 is a safety device intended to protect students from being struck while crossing in front of a school bus. Typically, school bus crossing arms are wire or plastic devices which extend from the front bumper 16 on the right side of the bus while it is stopped for loading/unloading to form a barrier. The purpose of the device is that students who need to cross the road will be forced to walk several feet forward of the front of the bus itself before they can begin to cross the road, thus ensuring that the bus driver can see them as they cross in front of the bus, avoiding a common blind spot immediately in front of the bus. The crossing arm 60 retracts flush against the bumper 16 while not activated, such as when the bus is in motion, as shown by the dashed arc in FIG. 3. As described above, the crossing light 12 may be spliced into the bus wiring system. Alternately, a micro-switch (not shown) may be mounted upon the crossing arm 60 with switch closing when the arm is deployed and opening when the arm is retracted against the front bumper 16. The micro-switch would then be simply connected between the crossing light 12 and the bus battery 32 (also not shown).

Another embodiment of the invention is shown in FIG. 4, where components that are similar to components shown in FIGS. 1 through 3 have the same numerical designators. In FIG. 3 a pair of red LEDs 64 that are mounted upon a rear surface of the school bus 10 and illuminated when the crossing light 12 is illuminated. While the red LEDs 64 are shown as being mounted in a low position upon the rear of the bus 10 in FIG. 4, the LEDs 64 also may be mounted in other positions that would be visible to the driver of a vehicle following the bus. The red LEDs 64 are separate from the amber warning lights 36 and red warning lights 46 that also are mounted upon the rear of the bus.

While the invention has been illustrated and described for use with school buses with left hand drive that are operated on the right side of the road, it will be appreciated that the invention also may be practiced in jurisdictions where school buses with right hand drive are operated on the left side of the road, such as, for example, in the United Kingdom. In such jurisdictions, the invention contemplates mounting the crossing light upon the front of the school bus with the light beam directed across the road to the right of the bus (not shown). For example, the crossing light for such an application may be mounted upon the right front bumper or fender of the bus (not shown) which would be opposite from the configuration illustrated in FIGS. 1 and 2, respectively. Similarly, a crossing arm may be hinged upon the left end of the front bumper (not shown) which would be opposite from the configuration illustrated in FIG. 3.

The present invention provides the following advantages:

The crossing light 12 illuminates students to oncoming vehicles from the front or rear of the bus as they cross in front of the bus 10;

The crossing light illuminates students along a line of sight connecting the point of safety beside the road where the students wait to the front of the bus where other lighting lights their way to the bus doors;

Use of the crossing arm 60 keeps students ten feet in front of bus where they are visible to the operator; and The crossing light 12 functions as an indicator to the students when it is safe to cross the road.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example two crossing lights may be utilized with one mounted upon the front fender 20 of the bus 10 and the other mounted upon the outer end of the crossing arm 60. Additionally, the invention contemplates mounting additional lights along the left side of the bus 10 that would be illuminated with the crossing light 12 to provide additional lighting of the road surface.

What is claimed is:

1. A school bus safety lighting system comprising:
   a crossing light mounted directly upon a front bumper on the driver's side of a school bus, the crossing light being adapted to provide a beam of light projecting outwardly from the driver's side and completely across the road upon which the bus is positioned to illuminate the path of passengers crossing the road to board or exit the bus;
   at least two red warning lights mounted upon a front surface of the bus adjacent to and above the front bumper, each of the warning lights being adapted to flash on and off to alert motorists about the presence of the bus and the passengers; and
   a controller operatively connected to the crossing light and each of the warning lights to selectively illuminate the crossing light and each of the warning lights.

2. The system according to claim 1 wherein the bus includes at least one access door and further wherein each of the warning lights is activated when the at least one access door is opened.

3. The system according to claim 1 wherein each of the warning lights is connected to a flasher circuit that is operative to cause each of the warning lights to alternately flash on and off when illuminated.

4. The system according to claim 3 wherein the bus has a plurality of red warning lights mounted thereon that are connected to the flasher circuit and are operable to alternately flash on and off when the at least one access door is opened.

5. The system according to claim 1 wherein the crossing light is manually illuminated upon closure of a manual switch.

6. The system according to claim 1 wherein the crossing light is mounted upon an end of the bumper.

7. The system according to claim 1 wherein the crossing light is adapted to have sufficient lumens to fully illuminate the path of the passengers crossing the road.

8. The system according to claim 7 wherein the lumens of the cross light is in the range of from about 500 lumens to about 1400 lumens.

9. The system according to claim 1 wherein the crossing light is an LED light.

10. The system according to claim 9 wherein the lumens of the crossing light is in the range of from about 500 lumens to about 1400 lumens.

11. The system according to claim 1 wherein each of the warning lights is an LED light.

* * * * *